United States Patent [19]
Oh et al.

[11] Patent Number: 5,938,457
[45] Date of Patent: Aug. 17, 1999

[54] RETRACTABLE INPUT/OUTPUT MONITOR CARRIAGE

[75] Inventors: Han-Soo Oh; Sang-Hyun Han, both of Kyungki-do, Rep. of Korea

[73] Assignee: SamSung Electronics Co., Ltd., Kyungki-do, Rep. of Korea

[21] Appl. No.: 08/910,565

[22] Filed: Aug. 20, 1997

[30]  Foreign Application Priority Data

Aug. 20, 1996  [KR]  Rep. of Korea ...................... 96-34440

[51] Int. Cl.$^6$ .................................................. H01R 13/44
[52] U.S. Cl. ............................................ 439/131; 361/683
[58] Field of Search ........................... 439/131; 361/683, 361/684, 724, 725, 726, 686

[56]  References Cited

U.S. PATENT DOCUMENTS 5,199,888  4/1993  Condra et al. .......................... 439/142
5,287,246  2/1994  Sen ......................................... 361/683

*Primary Examiner*—Neil Abrams
*Assistant Examiner*—Barry M. L. Standig
*Attorney, Agent, or Firm*—Robert E. Bushnell, Esq.

[57]  ABSTRACT

A retractable carriage containing input/output terminals mounted on a monitor including a housing installed in the monitor which receives the carriage, the carriage being biased such that the terminals are exposed, but configured to be maintained in a retracted position by a catch.

10 Claims, 11 Drawing Sheets

RETRACTABLE INPUT/OUTPUT MONITOR CARRIAGE

CLAIM OF PRIORITY

This application makes reference to, incorporates the same herein, and claims all benefits accruing under 35 U.S.C. §119 from an application entitled RETRACTABLE INPUT/OUTPUT MONITOR CARRIAGE earlier filed in the Korean Industrial Property Office on Aug. 20, 1996, and there duly assigned Serial No. 96-34440 by that Office.

BACKGROUND OF THE INVENTION

1. Field of the Invention

The present invention relates to a display device and, more particularly, to a display device having a removable voice input/output terminal box.

2. Discussion of the Prior Art

Multi-media type computers typically provide audio and video capabilities in order to run game packs and other devices. Some applications also require voice input and output.

Ideally, a voice receiving sensor or input should be in the front of the machine in order to secure a proximal location for good responsiveness to the voice of a user. However, the voice input should not be so large as to injure the external appearance of the product. If the voice input is provided on the sides or back of the monitor, the efficiency in receiving the voice of the user diminishes. The input also should be configured so as not to collect dust or other alien substances which may result in deterioration of the product's function and reliability. A need exists for a retractable carriage providing input and output capability.

SUMMARY OF THE INVENTION

In light of the above, the present invention is directed to a retractable input/output terminal box capable of being internally installed on a monitor that substantially obviates one or more of the problems discussed above. The input/output terminals include, but are not limited to, a microphone jack, a speaker jack and a headphone jack. The terminals may be concealed or exposed as necessary. The invention includes a housing which is fixed to a monitor housing or case. A carriage containing an input/output terminal box is received in the housing. A spring urges the input/output terminal box out of the housing, once a catch, fixed to the housing, is released.

A first object of the present invention is to provide a retractable input/output terminal box capable of being internally installed in a monitor.

Additional features and advantages of the invention will be set forth in the description which follows, and in part will be apparent from the description, or may be learned by practice of the invention.

It is understood that both the foregoing general description and the following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1A:
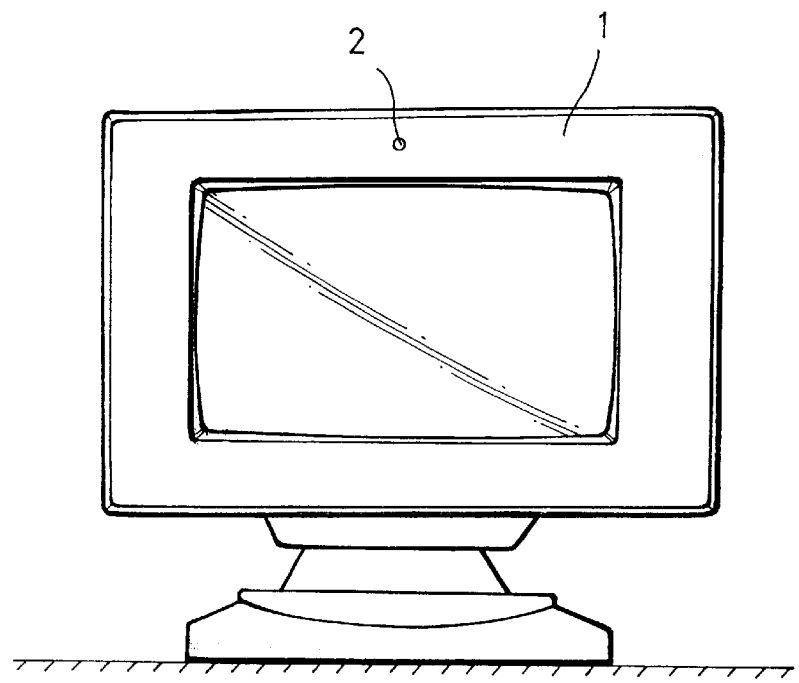
FIG. 1 is a front elevational view of the invention with the carriage shown in the retracted position.
Figure 1B:
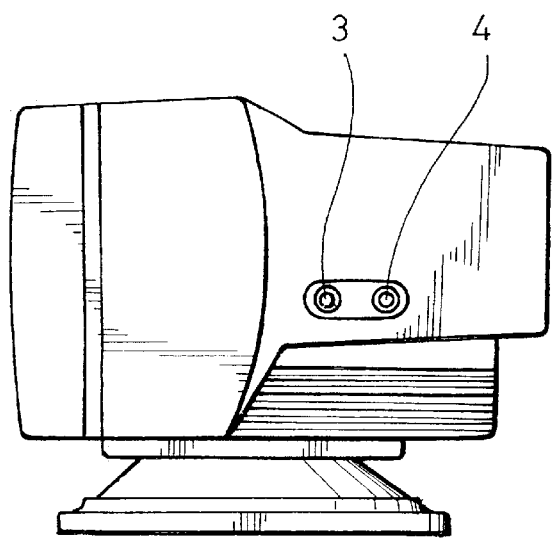
Figure 2A:
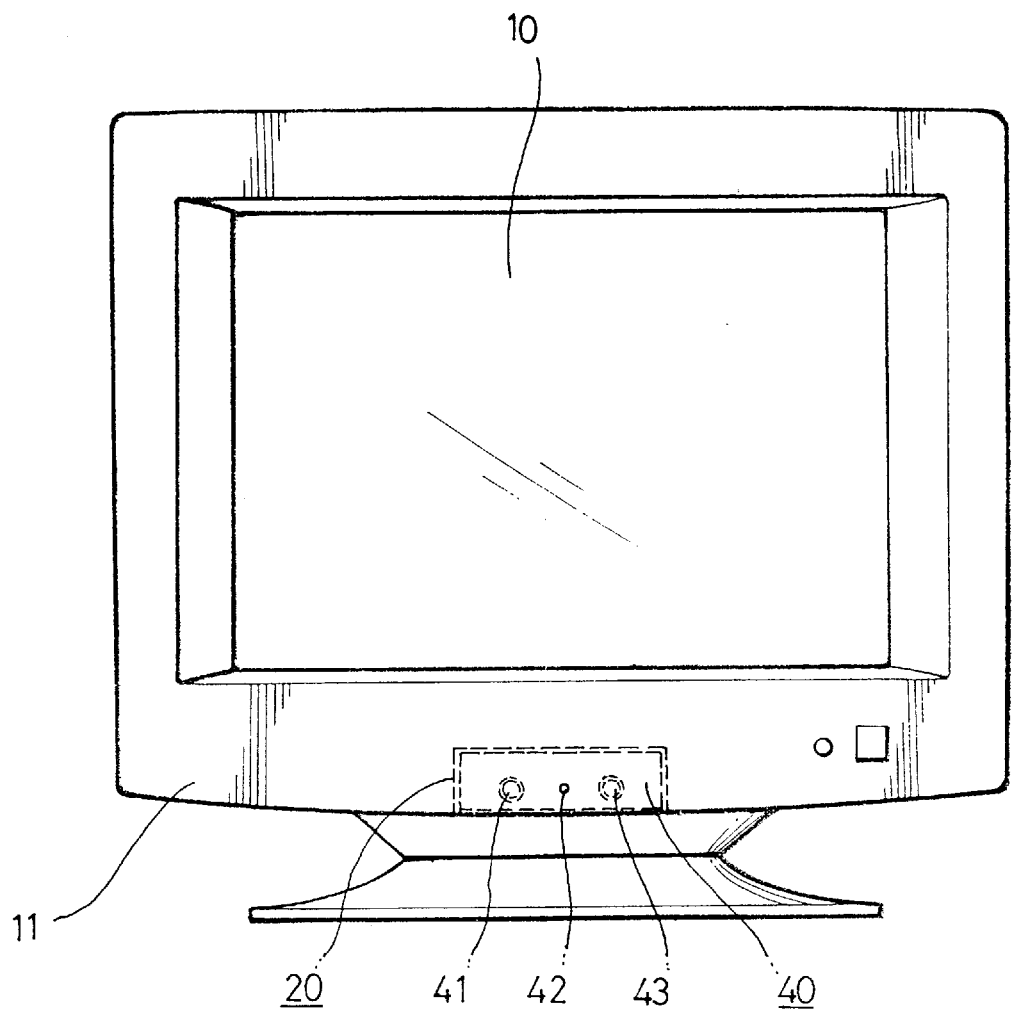
FIG. 2 is a front elevational view of the invention with the carriage in the extended position.
Figure 2B:
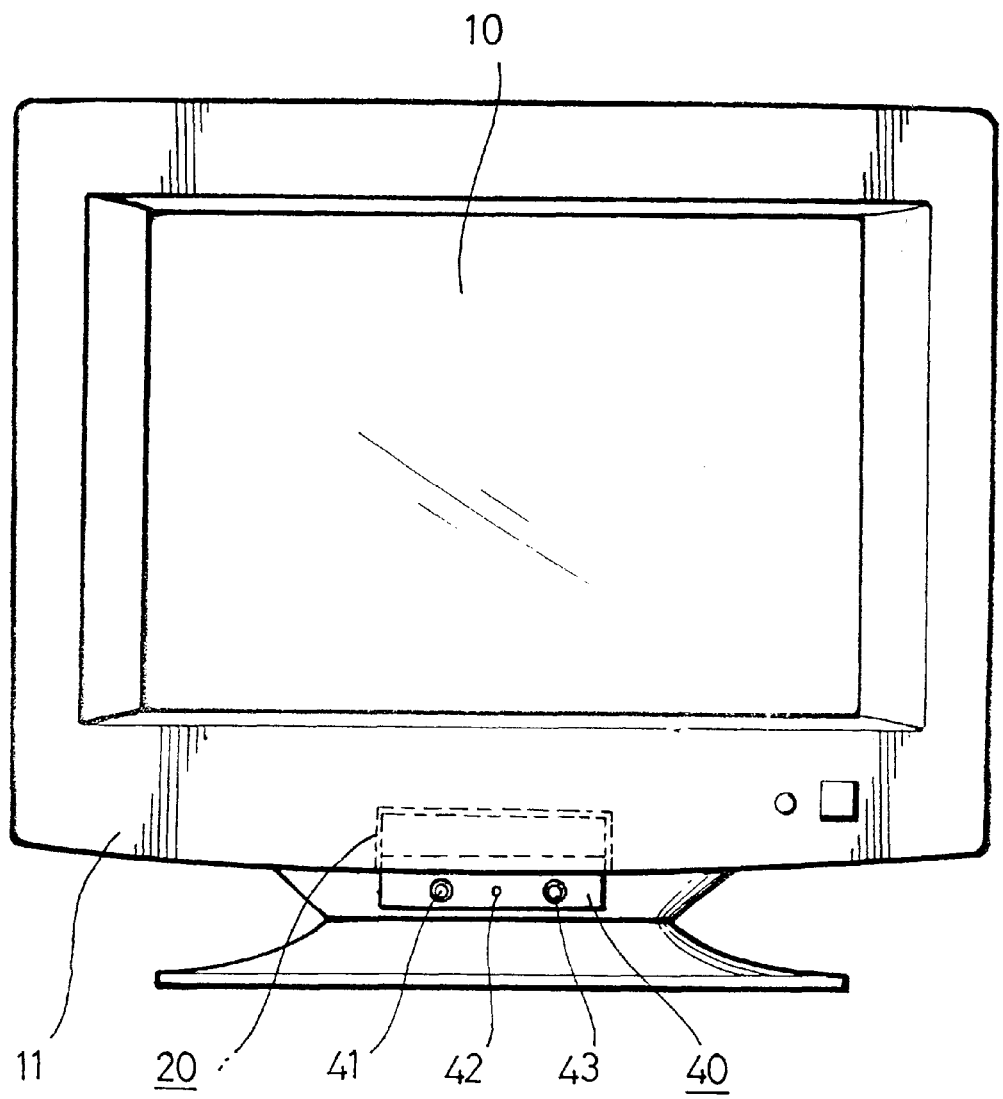
Figure 2C:
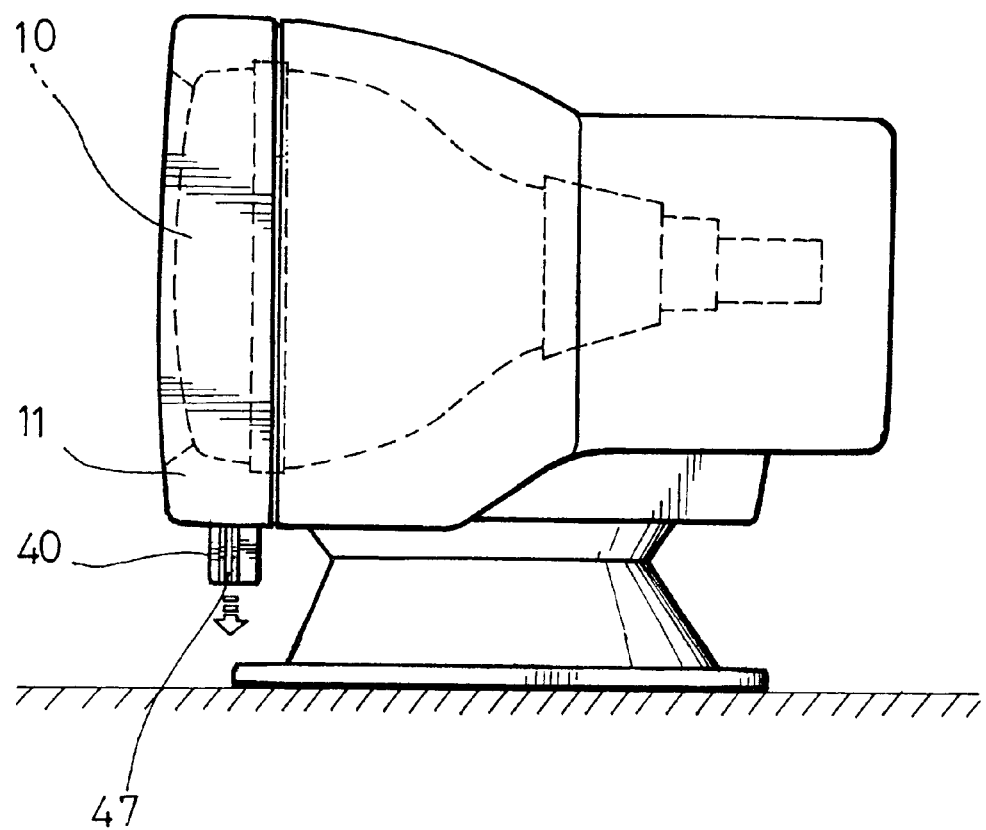
Figure 3:
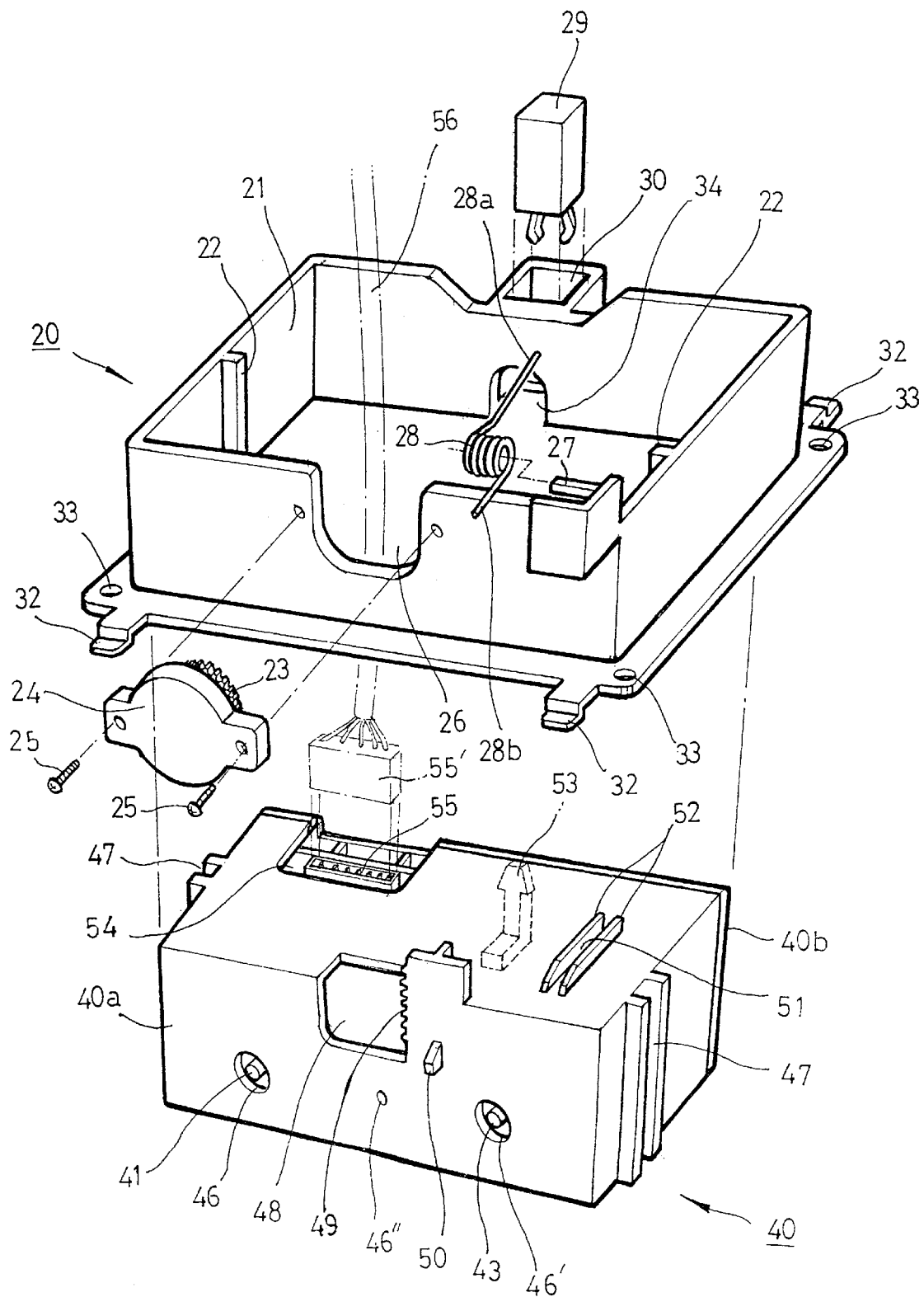
FIG. 3 is a right side elevational view of the embodiment shown in FIG. 2.

Referring to FIG. 1, a display device, or monitor 10, is shown including a housing or case 11 typically constructed from plastic material.

Figure 4:
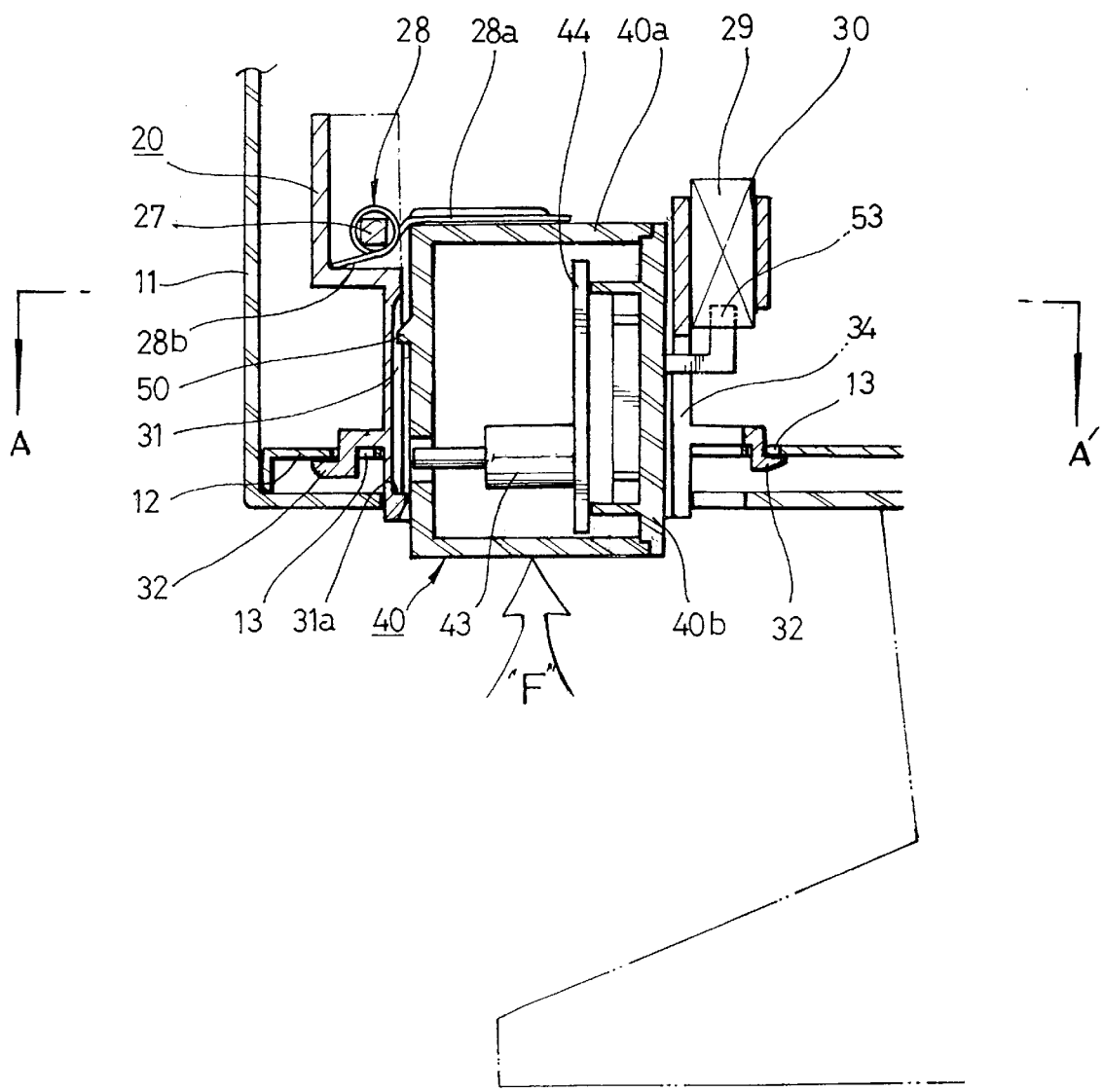
FIG. 4 is a partial top right front exploded perspective view of the carriage and housing of the present invention.

Referring also to FIG. 4, a housing 20 is installed in the case 11. The housing 20 has guide flanges 22 formed on the inner surface of the both side walls 21 thereof.

The invention also includes a carriage 40, containing at least one input/output terminal, preferably formed into a quadrilateral box shape with a body 40a and a cover 40b mounted thereon. The carriage 40 has guide grooves 47 formed on both sides thereof to receive the guide flanges 22 of the housing 20.

Figure 5:
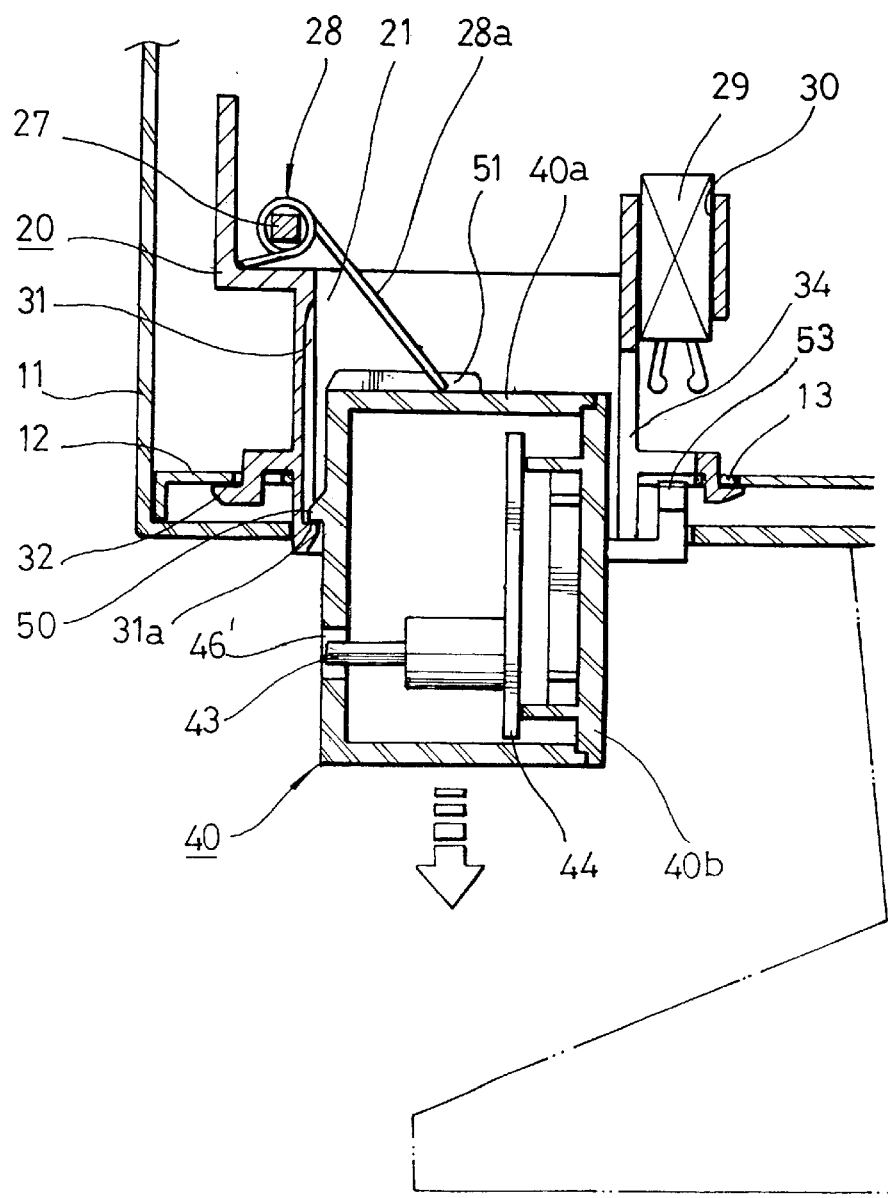
FIG. 5 is a partial cross sectional detail view of the embodiment shown in FIG. 1, drawn across line 5—5.
Figure 6:
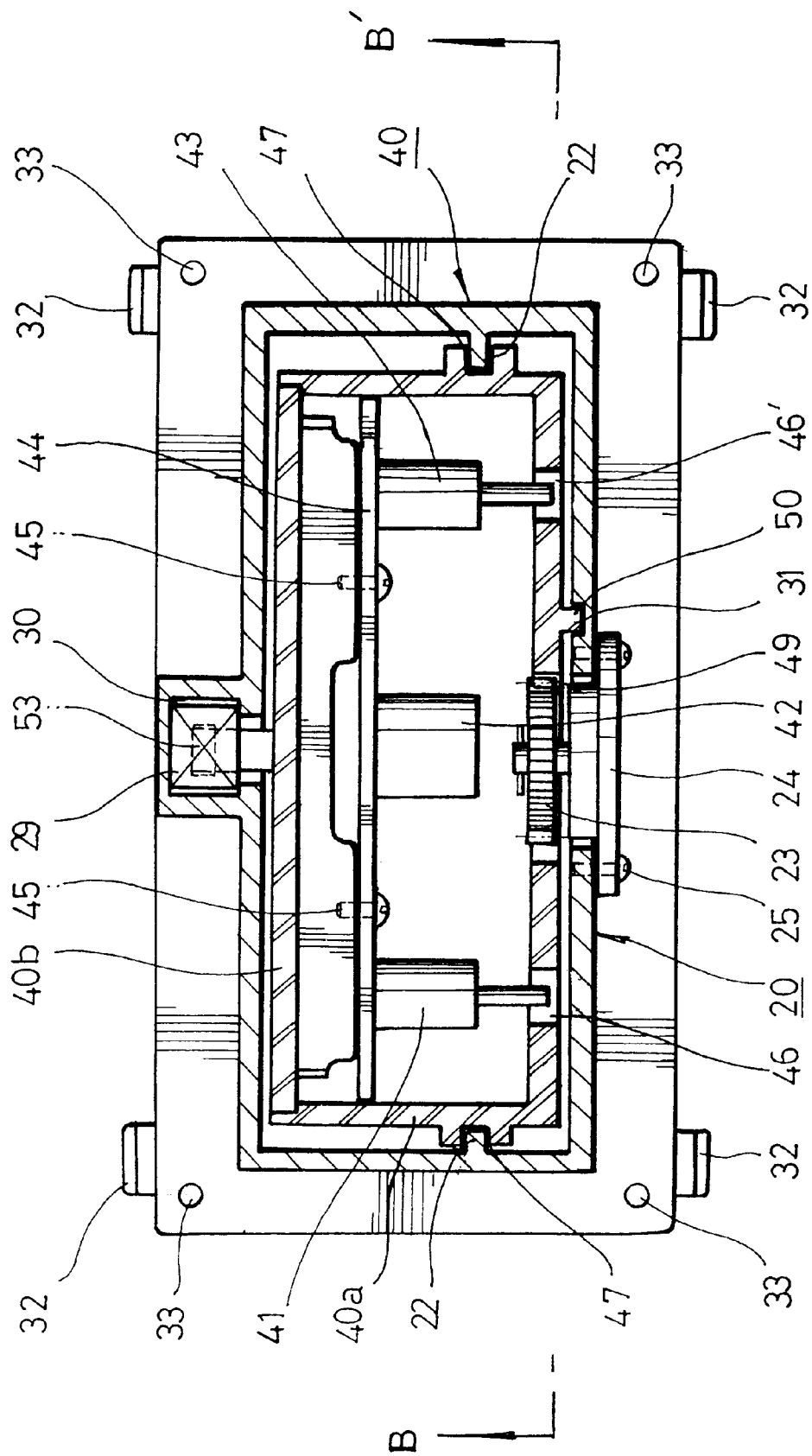
FIG. 6 is a partial cross sectional detail view of the embodiment shown in FIG. 2, drawn across line 6—6.

Referring to FIGS. 5 and 6, a stopper 50 projects from the carriage 40. The stopper 50 moves along a guide groove 31 in the housing 20. The carriage 40 is restricted from being withdrawn entirely from the housing by a projection 31a, formed in the lower part of the guide groove 31, when it interferes with the stopper 50.

A spring 28 is fitted onto a spring boss 27 formed in the upper part of the housing 20. A catch 29 is closely received in a hole 30 in back of the housing 20. The spring 28 biases the carriage 40 away from the housing 20, defining an extended position. However, the catch 29 is configured to overcome this bias and retain the carriage 40 in the housing 20 as needed.

Referring to FIGS. 4–6 and 8, the carriage 40 has a spring groove 51, defined by flanges 52 extending from the top side thereof. One free end 28a of the spring 28 is retained in the groove 51.

In order to conceal the carriage, the carriage 40 is forced into the housing 20, against the biasing force of the spring 28. The invention also provides means for maintaining the carriage 40 in this retracted position. The carriage includes a hook 53 that is received in a hole 30 in the housing 20. A catch 29 frictionally engages the hook 53 so as to overcome the bias force exerted by the spring 28, retaining the hook 53 in the hole 30.

The housing includes a damper 24 having a pinion 23 which is fixed on the front part of the housing 20 by screws 25. The pinion is received through slot 26. The damper 24 retards motion of the carriage 40 relative to the housing 20, reducing the occurrence of damaging sudden impacts that otherwise might occur.

The carriage has a rack 49 with teeth 149 formed on the one side of a pinion position hole 48 in the upper part of the front side of the carriage 40. The pinion 23 of the damper 24 rotates within the hole 48 and engages the teeth 149.

Figure 7:
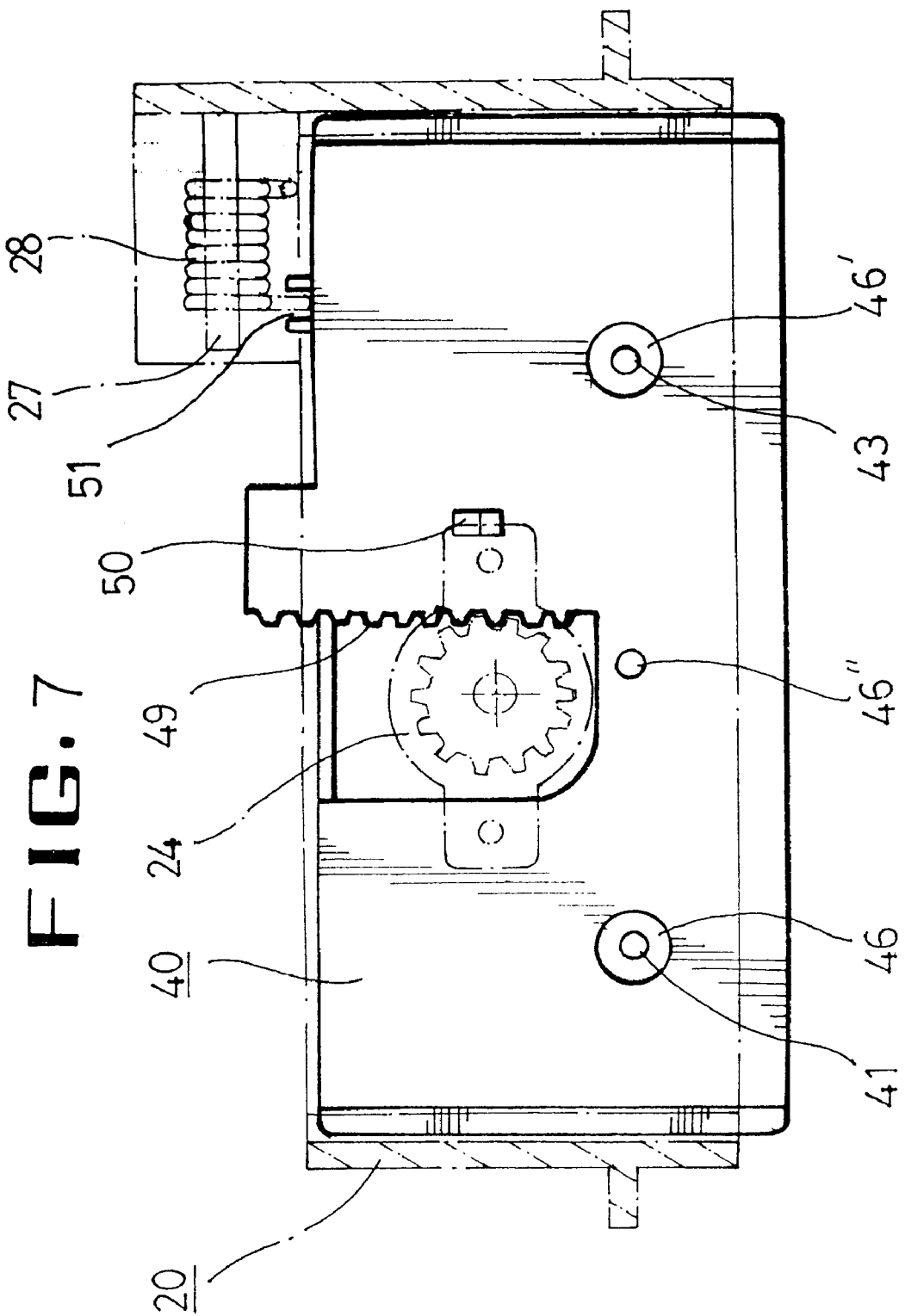
FIG. 7 is a cross sectional detail view of the embodiment shown in FIG. 5, drawn along line 7—7.

Referring to FIGS. 5–7, a terminal circuit board 44, having a speaker jack 41, a microphone jack 42 and a headphone jack 43, is installed in the box body 40a. The terminal circuit board 44 is fixed to the box cover 40b by screws for maintenance convenience. The speaker jack 41, microphone jack 42 and headphone jack 43 each are electrically connected to a speaker jack hole 46, microphone jack hole 146 and headphone jack hole 246, respectively, on the front side of the carriage 40. The holes 46 and 246 are relatively large in diameter, whereas the microphone hole 146 typically is smaller.

Connectors 55 and 55' are connected to each other through a cable hole 54 formed in the carriage 40 proximate to one side of the terminal circuit board 44. The housing 20 and carriage 40 define a carriage space though which a cable 56 passes in order to connect with the circuit section of the display device.

Referring to FIG. 5, to assemble the present invention, first, the housing 20 is fixed to the subframe 12 of a monitor 10. The housing 20 includes snap hooks 32 that may be inserted into and engage with holes 13 in the frame 12. Referring to FIG. 7, alternatively, the housing 20 may be fixed firmly to the frame 12 with screws 14 (now shown) via threaded holes 33 in the four corners the lower part of the housing 20.

Once the housing is secured, the carriage 40 is inserted into the housing 20, the guide flanges 22 of the housing 20 receiving the grooves 47 of the carriage 40. Although this flange-and-groove configuration is not critical to the invention, it is preferred in consideration of the parallelogram configuration of the housing and carriage.

Once the carriage 40 is inserted in the housing 20, the damper 24 is installed such that the teeth of the pinion 23 engage the teeth 149 of the rack 49. Stopper 50 is received in the guide groove 31 to resists ultimate dislodgement of the carriage 40 from the housing 20.

Referring to FIGS. 5 and 6, the spring 28 then is fitted onto the spring boss 27 of the housing 20. The free end 28a of the spring 28 is inserted into the groove 51 of the carriage 40, and the other free end 28b of the spring 28 is caught on the housing 20. The free end 28a of the spring 28 transfers the spring force to the carriage 40, urging the carriage 40 downwardly.

As shown in FIG. 5, the hook 53 in the back side of the carriage 40 is inserted into the slot 34 of the housing 20. The hook 53 is retained and released by conventional catch means.

When the speaker, microphone and headphone are not in use, the carriage 40 is retained in the housing 20 as shown in FIG. 5, by the hook 53 of the carriage 40. To use a remote speaker, microphone or headphone set, the carriage 40 is taken out of the housing 20. Referring to FIG. 4, by pressing the bottom side of the carriage 40 slightly upward in the F direction, the hook 53 is lifted up and released from the catch 29. The carriage 40 is released and moved downwardly by the force of the spring 28. This downward motion of the carriage 40 is halted by the stopper 50 interfering with the projection 31a in the guide groove 31. Carriage 40 movement is slowed by the damper 24.

Figure 8:
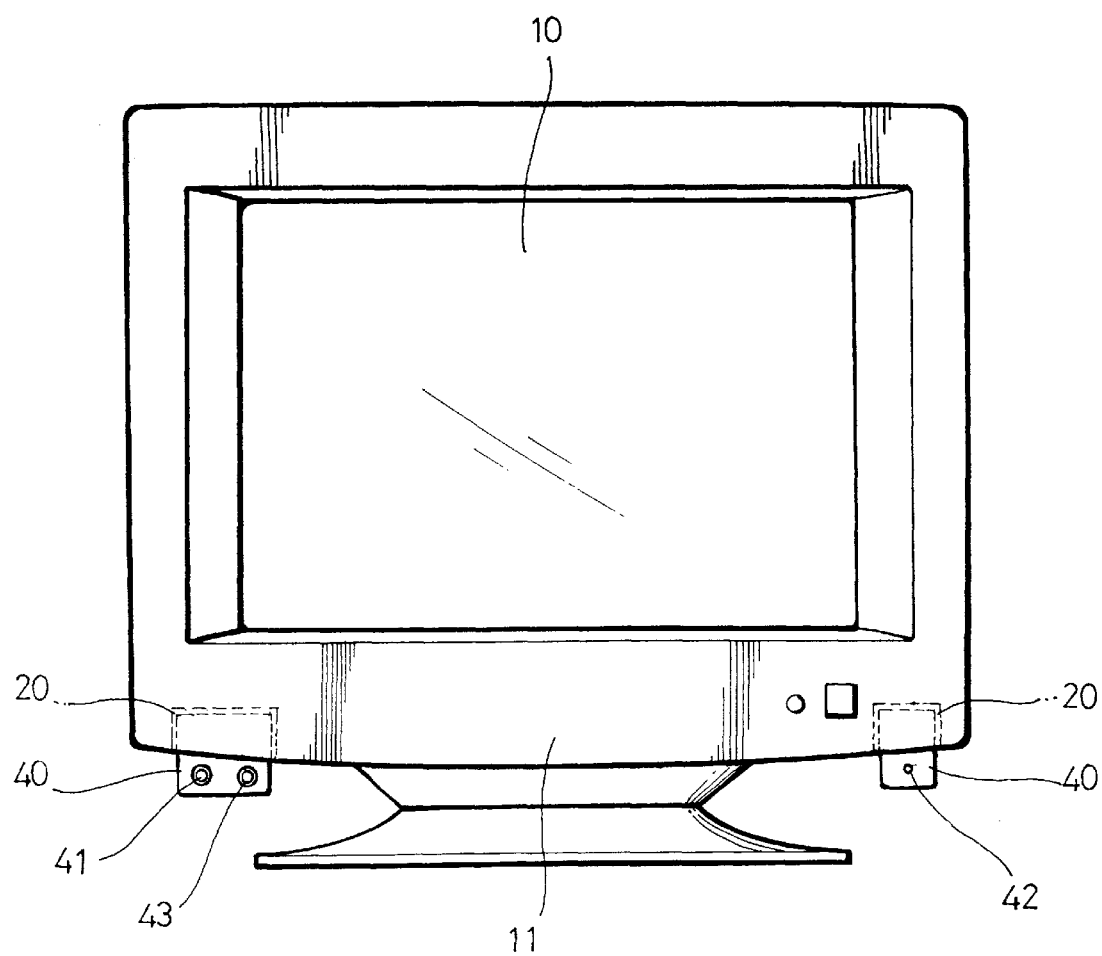
FIG. 8 is a cross sectional detail view of the embodiment shown in FIG. 7, drawn along line 8—8.
Figure 9:
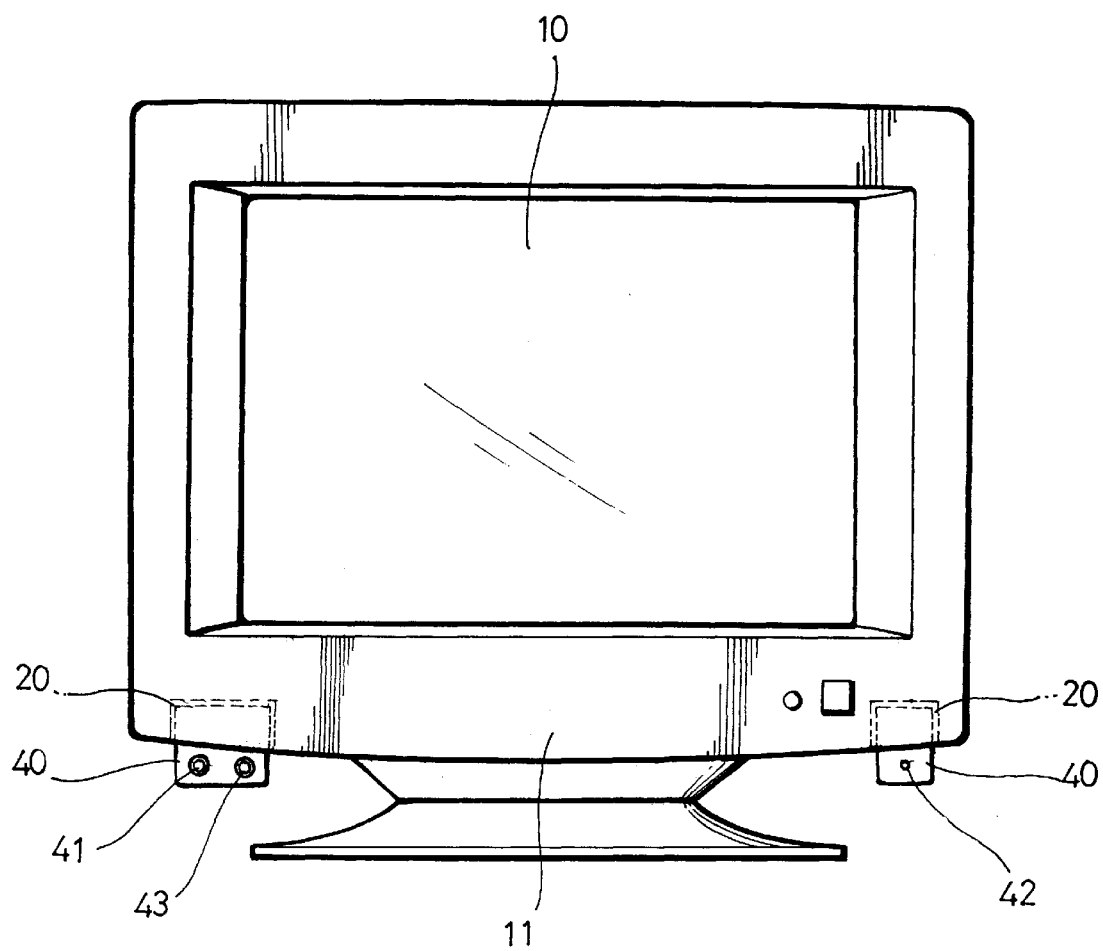
FIG. 9 is a front elevational view of a monitor incorporating the present invention shown in alternative placement.

Although a singular, centrally-disposed carriage 40 is preferred for the convenience of the user's operation of the speaker jack 41, the microphone 42 and the headphone jack 43, such is not critical to the invention. Referring to FIG. 8 another embodiment of the present invention is shown including a first carriage 40 with voice output terminals, such as a speaker jack 41 and a headphone jack 43, installed on one side of the monitor. A second carriage 40', having a microphone 42 as a voice input terminal, is installed on the other side of the monitor, independent of the first carriage 40.

It will be apparent to those skilled in the art that various modifications and variations may be made in the present display device having a voice input/output terminal box capable of being inserted into and taken out of the case according to the present invention without departing from the spirit or scope of the invention. As set forth in the appended claims.

What is claimed is:

1. A retractable terminal box configured to mount on a monitor comprising:

a housing mounted on the monitor;

a terminal box, having at least one input or output socket, slidingly received in said housing, said terminal box being movable from a retracted position to an extended position.

2. The retractable terminal box as recited in claim 1, wherein said terminal box is biased relative to said housing.

3. The retractable terminal box as recited in claim 1, one of said housing or said terminal box having at least one flange and the other of said housing or said terminal box having at least one groove, said at least one flange and said at least one groove being slidingly engaged.

4. The retractable terminal box as recited in claim 1, one of said housing or said terminal box including a hook and the other of said housing or said terminal box including a catch, releasably capturing said hook when said terminal box is in said retracted position.

5. The retractable terminal box as recited in claim 1, one of said housing or said terminal box including a stopper discouraging dislodgement of said terminal box from said housing.

6. The retractable terminal box as recited in claim 4, the other of said housing or said terminal box including a projection that interferes with said stopper and discourages dislodgement of said terminal box from said housing.

7. The retractable terminal box as recited in claim 1, one of said housing or said terminal box having a rack having teeth and the other of said housing or said terminal box including a pinion having teeth, said teeth of said rack and said teeth of said pinion being intermeshed.

8. The retractable terminal box as recited in claim 1, including a damper interposed between said housing and said terminal box.

9. The retractable terminal box as recited in claim 1, said housing and said terminal box defining a space receiving a cable.

10. The retractable terminal box as recited in claim 1, wherein said at least one input or output socket is selected from the group consisting of a headphone jack, a microphone jack, a speaker jack and combinations thereof.

* * * * *